April 17, 1956              R. MOEN              2,742,235
BROKEN WHEAT RECOVERY SYSTEM, INCLUDING TEMPERING
AND IMPACTING, AND SEPARATING OF SHATTERED
WEED SEEDS FROM WHEAT SEEDS
Filed Oct. 11, 1952                            2 Sheets—Sheet 1
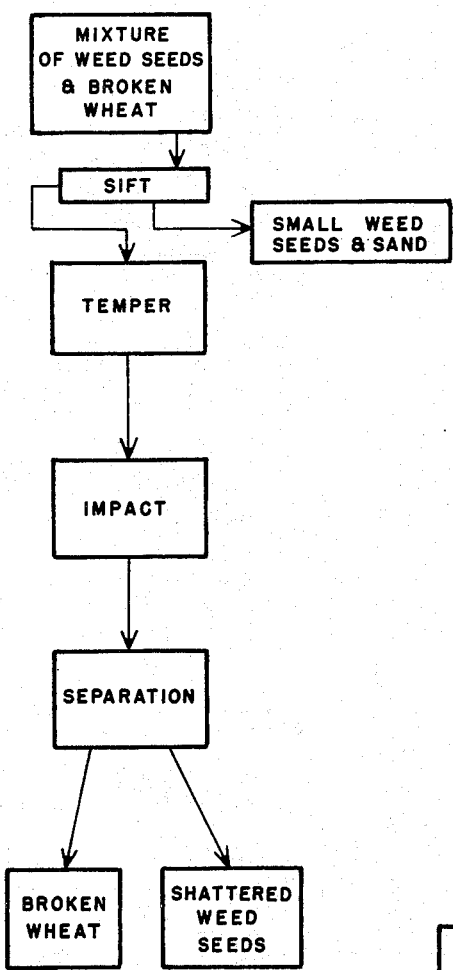
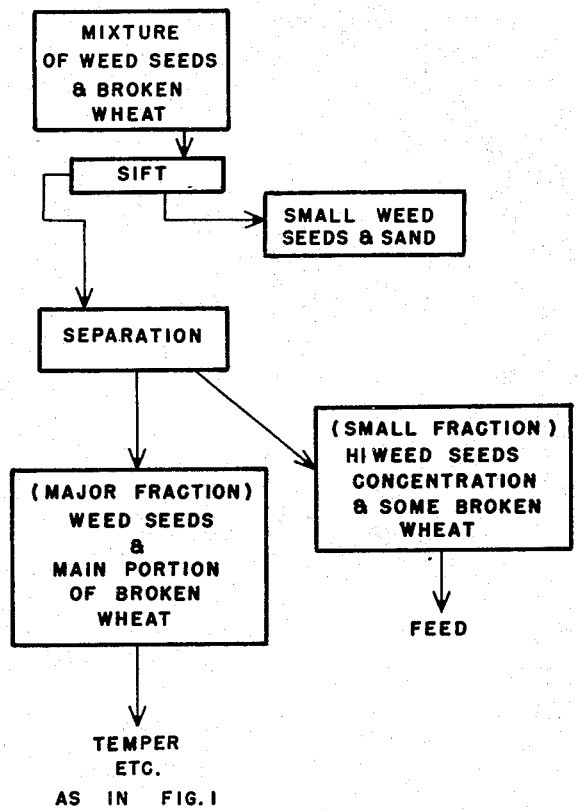
INVENTOR
ROLF MOEN
BY William C. Babcock ATTORNEY

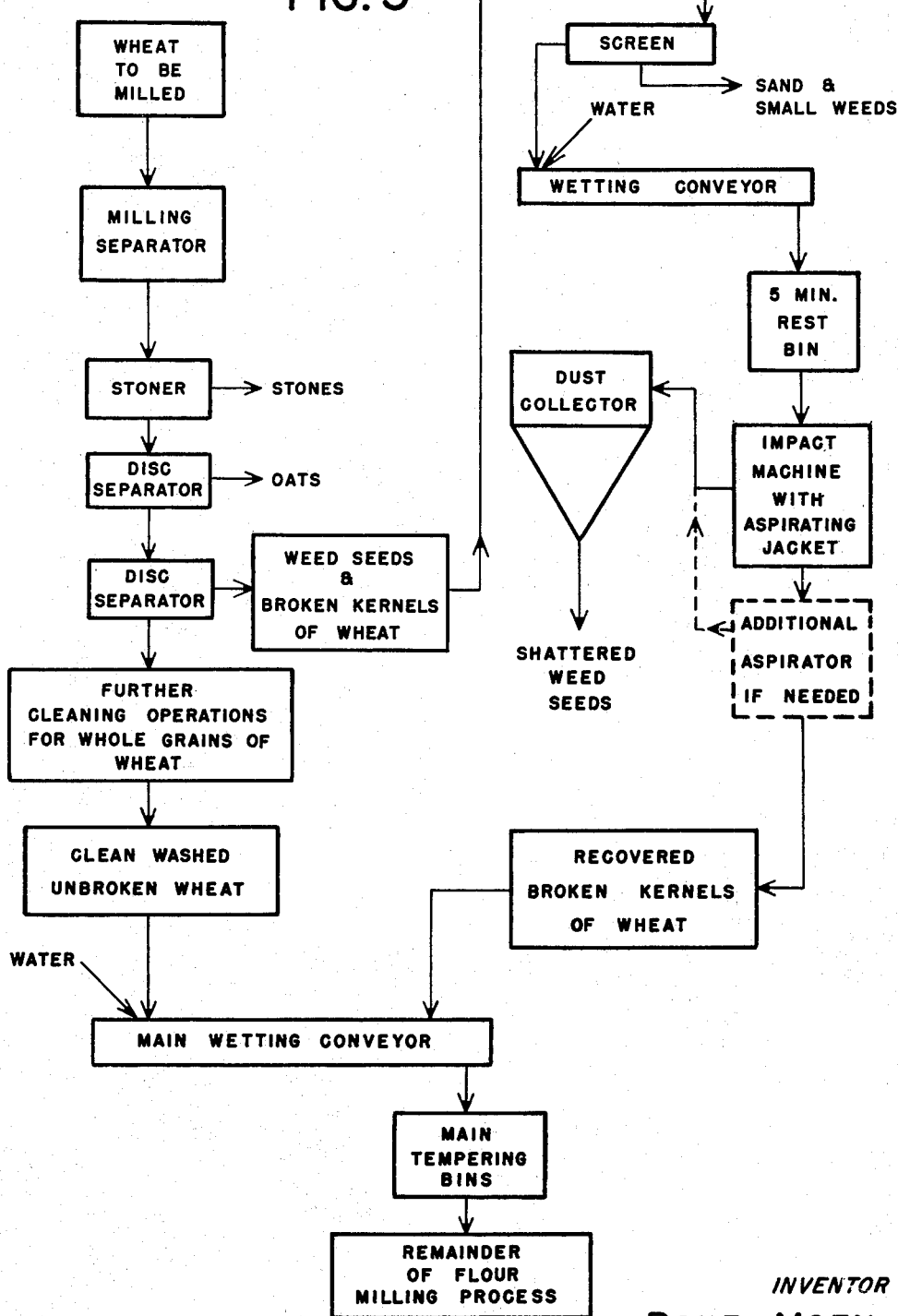

United States Patent Office 2,742,235
Patented Apr. 17, 1956

2,742,235

BROKEN WHEAT RECOVERY SYSTEM INCLUDING TEMPERING AND IMPACTING, AND SEPARATING OF SHATTERED WEED SEEDS FROM WHEAT SEEDS

Rolf Moen, Minneapolis, Minn., assignor to General Mills, Inc., a corporation of Delaware Application October 11, 1952, Serial No. 314,297

16 Claims. (Cl. 241—9)

The present invention relates to the milling of cereal grains and more particularly to a broken wheat recovery system as an addition to the usual milling process.

In the standard milling processes of the prior art, the wheat is subjected to a cleaning operation prior to normal tempering and milling. In this wheat cleaning part of the process, efforts are made to separate the various types of weed seeds and other impurities from the particular cereal grains to be milled. For example, it has been customary to remove sand and impurities of relatively small size by passage of the grain through a milling separator near the start of the cleaning system. The milling separator also removes large rough materials from the wheat. Aspiration may be used at this point to remove those particles which are capable of removal by aspiration.

It is then customary to pass the stock through separators of the indented disk or indented cylinder type to separate the whole grains of wheat and larger particles such as oats, from the small or broken grains of wheat and the weed seeds. These smaller weed seeds and broken wheat grains are found in the liftings of the indented disk or cylinder machines. A further and similar separation may be applied to these liftings to separate the smaller weed seeds and broken wheat grains from the slightly larger but still undersized whole grains of small wheat. Similarly, another separation by indented disk or cylinder machines can be used to separate the oats and longer grains from the desired standard or large size grains of wheat.

That portion of the liftings from the indented disk or cylinder machines represented by the small-size weed seed and broken wheat fraction can not be readily classified to a further extent by standard methods since the small weed seeds are substantially the same in size and weight as the broken kernels of wheat. It has therefore been customary to add this particular fraction to the mill feed, which is a by-product of the milling process. That portion of the fraction which actually includes broken kernels of wheat is thus lost to the flour milling portion of the process and represents a definite economic loss. This loss may be as great as one to two per cent of the wheat in processes involving bread wheats, or even five per cent of the wheat in a durum milling operation.

There have been proposals in the past for separation of certain types of weed seeds from whole grains of wheat of the same size by means of differential crushing or impact. The theory of such attempts has been that the weed seeds could be more readily broken or crushed than the whole grains of wheat of the same size and therefore a separation could be attempted based on such differential breaking. I have attempted to utilize this principle with the liftings of the indented disk and cylinder machines. These attempts, however, while useful for limited separation of a few of the more friable weed seeds, have resulted in too much additional breakage of the broken kernels of wheat, whenever the crushing or impact effect became great enough to shatter the majority of the undesired common weed seeds to any substantial extent. The fact that the wheat was already cracked or partially broken apparently made it almost as susceptible to shattering as the more common weed seeds.

Therefore, until the present invention, there has been no satisfactory method for use in combination with the standard cleaning and milling process, which would effectively recover the broken kernels of wheat from weed seeds of similar size, permit the addition of this broken wheat fraction to the flour milling portion of the process, and thus eliminate the loss of the broken wheat to feed.

With these problems and difficulties of the prior art in view, it is one object of the present invention to provide an economical and useful broken wheat recovery system.

A further object is the provision of a practical and efficient method for the recovery of broken kernels of wheat from a mixture of such kernels with weed seeds of similar size.

Still another object is the provision of a broken wheat recovery system in which a mixture of broken wheat kernels and weed seeds can be subjected to differential breaking by impact and thus provide a basis for satisfactory separations.

Still another object is the provision of an improved process for increasing to an economically useful degree, the differential breaking effect of impact on a mixture of broken cereal grains and weed seeds.

In general, I have found that these objects can be accomplished by subjecting the mixture of broken cereal grain kernels and weed seeds to a tempering step before the mixture is subjected to breaking or impact. I have also found that it is possible to take advantage of the fact that the open or broken end of these wheat grains absorbs moisture initially at a much greater rate than weed seeds of similar size. The present invention therefore contemplates the differential tempering of the broken wheat and weed seeds to provide greater elasticity for the broken wheat kernels and thus minimize the shattering of such kernels when the mixture is subjected to breaking forces. The invention also involves the combination of such tempering with differential impact to shatter the weed seeds without substantial damage to the broken wheat kernels. Finally, the invention contemplates the use of aspiration to separate the major proportion of the shattered weed seeds from the heavier unshattered kernels of broken wheat.

In the drawings which accompany this application, Figure 1 is a flow sheet showing schematically the steps of a broken wheat recovery process according to the present invention.

Fig. 2 shows a possible modification of the process of Fig. 1 in connection with wheats having a relatively high weed seed content; and Fig. 3 shows the application of a broken wheat recovery system to a standard wheat cleaning and flour milling process according to the invention.

As shown in Fig. 1, the present broken wheat recovery system is applied to a mixture of weed seeds and broken wheat of substantially similar size. Preferably, this mixture is first subjected to a sifting operation which will remove any small weed seeds and sand which have not been previously removed by the cleaning system. This preliminary sifting, for example, can be made on a No. 12 wire or the equivalent.

After the preliminary sifting step, the mixture of broken wheat and weed seeds is subjected to a tempering step. Because the open or broken end of the wheat particles permits initial moisture absorption at a relatively high rate, this tempering can be much shorter than that required in the normal cereal grain milling process. Since the actual time may vary with the type of wheat and the method of moisture addition, the present invention contemplates that the tempering will be sufficient to bring the broken wheat to a moisture content in the range from twelve per cent to twenty per cent of the dry wheat weight. The specific upper limit of this range in a given case will be dictated largely by the ease of later milling of the broken wheat. A moisture content substantially above this range will make the subsequent milling more difficult. Within this range, the preferred moisture content is substantially fifteen per cent.

After the addition of sufficient moisture to achieve the desired tempering, the mixture is given a suitable rest time. As noted above, the untempered broken wheat is almost as susceptible to shattering as the weed seeds. The cracked or broken wheat, however, can absorb moisture very rapidly. With a tempering rest time of as little as three to five minutes, there is a rapid decrease in friability or brittleness of the broken wheat. Thus the wheat rapidly becomes sufficiently elastic to resist further shattering when subjected to breaking or impact forces.

At the same time, the unbroken weed seeds absorb moisture much more slowly. Thus the brittleness of these weed seeds is not substantially decreased during a five-minute tempering rest period. The tempered mixture can then be subjected to breaking or impact forces which produce a maximum effective shattering of the brittle weed seeds without substantial further breakage of the tempered and more elastic broken wheat.

As far as the broken wheat is concerned, I have found that the tempering rest time could be extended beyond the five-minute range to as much as one hour or even eight hours. During this extra rest period, however, the elasticity or resistance to shattering of the wheat would increase only slightly, if at all, over the elasticity obtained after substantially five minutes.

The weed seeds, on the other hand, show a slow but steady increase in toughness, as the tempering time is extended. For the longer tempering times, the breakage of weed seeds decreases, so that fewer weed seeds will be shattered sufficiently for separation from the mixture. This change is gradual, but the rate of decrease in weed seed breakage with longer tempering is apparently greater than the rate of improvement, if any, in elasticity of the broken wheat.

In other words at a tempering time of substantially five minutes, the ultimate recovery of broken wheat will be almost, if not fully, as high as it would be at longer tempering times. The amount of weed seeds left unshattered (and therefore incapable of separation from the broken wheat) will be relatively lower at the five-minute range than at longer periods of temper. Thus, while satisfactory results can be obtained with longer tempering times in cases where a slightly higher percentage of weed seeds can be accepted in the final product, the preferred tempering time according to the present invention is substantially of the order of five minutes. This relatively short tempering time also has the economic advantage that the storage bins required for handling the mixture during tempering can be kept at a minimum. So in a given operation, one may choose to use the longer tempering times, if it appears that there is enough more wheat recovered to offset the cost of extra storage bin capacity, and if the somewhat higher weed seed content can be accepted within the quality standards for the particular operation.

The simplest method of adding the tempering moisture is by direct cold water addition at the head of a wetting conveyor. Addition of moisture by other methods is also satisfactory. For example, moisture has been added by contacting the mixture with steam, to produce moisture contents in the specified range, without substantial change of the tempering rest times or results just described.

For the actual differential breaking operation, the present invention contemplates the use of impact machines to achieve the desired differential shattering. The individual particles are projected against a suitable impact surface at velocities sufficient to shatter the more brittle weed seeds, without substantial shattering effect on the tempered and more elastic broken or cracked kernels of wheat. To produce the desired impact forces, various types of impact machines are available. Some of these machines include rotors with a large number of pegs which subject the particles to a series of multiple impacts of unpredictable force and effect. While some results can be obtained with such machines, it is generally preferred, according to the present invention, to use a type of impact machine in which each particle in the mixture is subjected to a single impact under more controlled conditions.

For example, the particles may be fed to the center of a distributing rotor of the radial vane type, so that each particle is centrifugally forced radially outwardly along the vanes and then leaves the rotor along a somewhat tangential path to strike a cylindrical impact surface or liner which surrounds the rotor. The actual effective shattering force of the impact depends upon a number of factors, such as the velocity of the individual particle at the time of impact, the angle of impact, and the nature of the impact surface. The velocity factor can be controlled in part by the diameter of the rotor and the speed of its rotation. The rotor speed and diameter will determine the tangential component of velocity at the instant a particle leaves the rotor. The radial component of velocity at this instant depends not only on this rotor diameter and speed, but also on the frictional resistance to outward sliding of the particles along the vanes, and the radial distance from the rotor center to the point at which particles first engage the vanes or blades of the rotor.

The actual velocity and angle of impact will depend, in turn, not only on the resultant velocity at the instant the particles leave the rotor, but also on the radial airspace between rotor and liner, and the type of corrugations, if any, on the impact surface. Where the impact surface is perfectly cylindrical and smooth, the particles will strike this surface a glancing blow as they leave the rotor and cross the airspace. Certain types of impact machines increase the impact effect by the use of a corrugated liner for the impact surface, the corrugations of this liner being oriented so that the individual particles tend to strike perpendicularly against the faces of the corrugations. With such a corrugated liner, lower particle velocities can generally be used to achieve the same shattering effect on the particles as would be achieved with higher particle velocities and a smooth cylindrical impact surface.

Because the desired impact forces can be achieved with different types and sizes of machines operated at speeds which vary according to the particular machine to be used, and because of the difficulty of measuring the absolute particle velocity to define the operating range of impact forces, I have resorted to an equivalent yardstick for the definition of such range.

In general, satisfactory differential breakage between weed seeds and broken wheat kernels can be achieved by the use of impact forces equivalent to those obtained with a machine having a corrugated cylindrical impact surface of the dimensions specified in Example 3 below, a 13 inch diameter vane-type rotor in which the particles first engage the vanes 3½ inches from the rotor center, and a rotor speed in the range from 3300 to 3900 R. P. M. The impact velocities corresponding to these conditions are believed to be approximately in the range from 220 to 290 feet per second at an impact angle which is roughly twenty degrees off the perpendicular, due primarily to the twenty degree vertical inclination of the corrugations set forth in Example 3. In other words, the particle moves along a path which substantially coincides with a line normal to the line of intersection between the plane of the rotor and the impact surface at the point of impact, while the particle path makes a twenty degree angle with a line normal to the line of intersection between the impact surface and a plane which contains the particle path and is perpendicular to the rotor at the point of impact. Since the particle path may change as the rotor speed changes, the angle of impact in the rotor plane may vary somewhat from the perpendicular in a given case, although an effort is made to achieve perpendicular impact. Because the computations of these velocities and of the impact angle are based on certain assumptions as to friction along the rotor blade and ignore the possibility of air damping or deflection in crossing the space from rotor to impact surface, it is felt that the actual machine dimensions and speeds provide a more accurate yardstick by which to define the impact forces.

Best results were obtained with the above impact machine at a rotary speed of 3500 revolutions per minute. Subject to the same assumptions and limitations mentioned above, this preferred case is believed to involve actual impact velocities of the order of 245 feet per second.

As pointed out above, these preferred operating ranges would involve higher particle velocities with smooth impact liners which provide an acute angle of impact yielding a more glancing blow. For example, a rotor diameter of 13½ inches, operated at 4300 R. P. M. shows good results with a smooth cylindrical impact surface of 18 inches internal diameter. In some cases, equivalent selective impact forces can even be achieved by successive passage through two impact machines either or both of which produce effective velocities somewhat below the above specified ranges. Pin rotors give more gentle impact than vane rotors.

Equivalent velocities for other impact surfaces and for impact machines of other types and dimensions can be readily determined by simple tests in any given case. Within these ranges, as set forth above, the impact effect will be sufficient to shatter or hull substantially all of the weed seeds normally present in large quantities with cereal grains, such as black bindweed, cockle, and foxtail, as well as many seeds which are present in smaller quantities, such as pigweed and sorrel.

There are, of course, certain exceptions in which the weed seeds are actually more resistant to impact than wheat. Such seeds include mustard, vetches, and pigeon grass. Because of their small size, mustard seeds can be removed by the preliminary sifting operation described above, while vetches and pigeon grass normally occur in such small quantities that they do not represent a serious problem. If their removal should become necessary, a spiral separator could be used.

After the differential impact step of the process, it is necessary to separate the broken weed seed particles from the substantially unchanged broken wheat kernels. While various separations on the basis of shape and size might be utilized, the present invention contemplates aspiration as the preferred method of separation. Attempts to remove the weed seed hulls and pieces from the wheat by sifting or thickness grading proved less successful because of excessive wheat loss. Separation on the basis of terminal velocity of the particles, as in aspiration, yields much better results and avoids substantial wheat loss at this point.

Suitable aspirating air velocities range from five to thirteen feet per second depending upon the nature of the weed seeds present. The preferred velocity is substantially nine feet per second. These velocity values are based on an aspirating device in which the flow of air is uniform over the entire cross-sectional area of aspiration. Higher values are required in aspirators with non-uniform flow.

In some cases, a preliminary modification of the broken wheat recovery system may be used as illustrated in Fig. 2 of the drawing. This modification is particularly suitable in the case of spring wheats having very high concentrations of weed seeds. According to this variation, the mixture is first subjected to a classification or separation step in which a small fraction, high in weed seed content, is removed. For example, a gravity table can be used for preliminary removal of about fifteen per cent of the liftings and will substantially simplify recovery of broken wheat from the remaining eighty-five percent. In this case, the broken wheat removed in the small or fifteen per cent fraction will represent a very small proportion of the total broken wheat in the liftings subjected to the present process, and therefore the loss of this small portion of the broken wheat to feed will not be serious. The broken wheat recovered from the remaining eighty-five per cent or major fraction will represent a substantial economic gain as against the prior art operations in which no broken wheat recovery is attempted.

To illustrate the application of the principles of the present invention the following examples are given.

*Example 1*

A mixture of weed seeds and broken kernels of wheat comprising the liftings of an indented disk separator in a durum wheat cleaning operation was processed as follows. After preliminary sifting over 12 wire to remove sand and other small impurities, the mixture was tempered by addition of enough water to bring the wheat moisture content to substantially fifteen per cent of the dry wheat weight, followed by a tempering rest time of five minutes. The mixture was then subjected to impact in a machine having a smooth cylindrical impact surface of eighteen inches internal diameter, and a 13½ inch diameter vane-type rotor in which the particles first engaged the vanes or blades at a radial distance of 3½ inches from the rotor center. The rotor speed was 4300 R. P. M.

The shattered weed seed particles were then removed by aspiration in a vertical air current at an air velocity of nine feet per second uniformly over the cross-sectional area of aspiration. The recovered broken wheat was substantially free from such dark colored particles as the black bindweed originally present in the mixture and was suitable for reintroduction in the durum milling process without adverse effect on the rigid color requirements of a durum operation.

*Example 2*

A broken wheat recovery system according to the present invention was incorporated in a normal durum wheat milling flow as shown in Fig. 3. The seeds and cracked wheat lifted on an indented disk separator were passed over a sand screen of 12 wire. Following this preliminary screening operation, the wheat was passed through a wetting conveyer in which sufficient moisture was added to bring the total moisture content to fifteen per cent of the dry wheat weight. Following the application of the necessary water, the tempering step proceeded with a rest time of approximately five minutes.

The weed seed and broken wheat mixture thus tempered was then subjected to differential impact by means of a 13 inch vane-type rotor operating at 3500 R. P. M. against a corrugated liner with the specific dimensions and corrugations noted below in Example 3. The particles first engaged the rotor blades three and one-half inches radially out from the rotor center. The impact machine was equipped with an aspirating jacket with an air flow sufficient to register 0.9 inch water gauge differential pressure. Since this particular aspiration did not provide a sufficiently selective separation, a second aspiration was made at a uniform air velocity of ten feet per second. The broken wheat recovered by this operation gave a yield of eighty-five to ninety per cent of the total initial weight of weed seeds and broken wheat, which was suitable for reintroduction into the milling system. The recovered wheat appeared essentially free from dark colored weed seed coats which could cause specks in flour.

This recovered wheat was returned to the durum milling system by introduction at a point subsequent to the moisture addition of the normal wheat tempering operation to avoid excessive moisture pick-up by the broken wheat through direct water addition. Here the broken wheat was added just before the wheat reached the tempering bins. The broken wheat then reached milling moisture by equalizing with tempered whole grains of wheat during the standard tempering rest period. The mixture of whole and broken kernels of wheat was then processed to flour in the usual manner.

*Example 3*

The broken wheat recovery system according to the present invention can also be utilized in connection with a standard flow for the milling of bread wheats. The actual flow is similar to that described in Fig. 3 and Example 1, with only minor changes. The tempering involves water addition sufficient to bring the moisture content to fifteen per cent. The impact step follows immediately after a tempering rest time of five minutes. For the impact step, a machine with a 13 inch diameter vane-type rotor and a corrugated liner is operated at 3500 R. P. M. The particles initially engage the rotor blades at a radial distance of 3½ inches from the rotor center, and the corrugations provide perpendicular impact surfaces whose inner edges are located on a circle of 14⅜ inches diameter and whose outer edges are located on a circle of 15⅜ inches diameter, with each corrugation covering approximately ⅞ inch along the outer circle. While these corrugations provide impact faces more nearly perpendicular to the paths of projection of the particles, as measured in the horizontal plane of the rotor, they are inclined roughly twenty degrees from the vertical (i. e., from a line perpendicular to the plane of the rotor), in order to deflect the impacted particles downwardly out of the impact zone and away from the rotor.

For separation after impact, a single aspiration is used at a uniform air velocity of ten feet per second. The recovered broken wheat can then be reintroduced in the main mill flow as shown in Fig. 3 at a point subsequent to the addition of moisture in the main tempering step. The actual impact forces in a given case may require adjustment to obtain optimum results from specific bread wheat varieties. In general, these bread wheats require more careful handling, since there is a smaller differential between the forces required for weed seed breakage and those forces which will shatter the broken bread wheat grains, than the differential between the forces required for weed seed breakage and those which will shatter broken durum grains.

The yield of recovered broken wheat in this particular mill flow was of the order of seventy per cent of the total initial weight of the weed seed and broken wheat fraction and thus represents a definite economic advantage over prior mill flows in which no such broken wheat recovery system is incorporated. It is lower than the yield in Example 2, partly because of the smaller breakage differential just noted. It might be increased by more gentle treatment with slightly lower impact forces in a given case.

While the above examples illustrate the application of the present invention to specific milling operations, it will be understood that the effectiveness of a broken wheat recovery system will be largely dependent upon a number of factors. The first factor is the variety of wheat, inasmuch as soft wheats are less susceptible to shattering by impact than the hard vitreous varieties. Secondly, the nature of the weed seeds present will affect the operation, since all weed seeds do not respond equally to impact breakage. Finally, the quality required of the broken wheat recovered will determine to a large extent the amount of recovery which can be attempted.

Thus each mill presents a separate problem, and the exact procedure to be followed may have to be adapted to the particular situation, in accordance with the general teachings and principles expressed above. The optimum conditions for any given application can, however, be readily determined by a few simple tests, once the above principles are understood. Since minor changes, variations, and modifications of the present process will be readily apparent to those persons skilled in the milling field, the present invention is intended to cover those variations in operating conditions and processing technique which fall within the scope of the attached claims.

Now, therefore, I claim:

1. The method of recovering broken kernels of cereal grain from a mixture of such kernels with weed seeds of substantially similar size which comprises tempering the mixture for a relatively short time sufficient for moisture absorption by the broken kernels, terminating the tempering before substantial moisture absorption by the weed seeds takes place, and subjecting the tempered mixture to a breaking step in which the breaking forces are adjusted to break up the relatively drier and more brittle weed seeds without substantial shattering of the moistened and more elastic broken kernels, and thereafter segregating the un-shattered broken kernels of wheat from the smaller particles of shattered weed seeds.

2. The method according to claim 1 in which the tempering step involves the addition of moisture in an amount sufficient to bring the moisture content of the broken kernels within the range from twelve per cent to twenty per cent of the dry wheat weight.

3. The method according to claim 2 in which the moisture content of the broken kernels is brought to substantially fifteen per cent.

4. The method of recovering broken kernels of wheat from a mixture of such kernels with weed seeds of substantially similar size which comprises tempering the mixture for a relatively short time sufficient for moisture absorption by the broken kernels, terminating the tempering before substantial moisture absorption by the weed seeds takes place, and subjecting the tempered mixture to an impact step in which each kernel and seed is projected forcibly against an impact surface at a velocity just sufficient to break up the relatively drier and more brittle weed seeds without substantial shattering of the moistened and more elastic broken kernels, and thereafter segregating the un-shattered broken kernels of wheat from the smaller particles of shattered weed seeds.

5. The method of claim 4 in which the impact step comprises projecting the kernels and seeds at velocities yielding impact effects equivalent to those achieved by centrifugally flinging them from a 13 inch diameter vane-type rotor in which the particles first engage the rotor blades 3½ inches radially out from the rotor center, at rotor speeds in the range from 3300 to 3900 R. P. M., against a corrugated cylindrical impact surface in which the corrugations provide impact surfaces substantially perpendicular to the paths of projection of the particles, as measured in the plane of the rotor, the impact surfaces being inclined approximately twenty degrees from the perpendicular to said plane, and the inner edges of the corrugations being located on a circle of 14⅜ inches diameter, the outer edges on a circle of 15⅜ inches diameter.

6. The method of claim 5 in which the equivalent 13 inch rotor speed is substantially 3500 R. P. M.

7. The method according to claim 4 in which the segregated broken wheat kernels are recombined with whole kernels of wheat in a standard flour milling process at a point subsequent to normal addition of tempering moisture to the whole kernels.

8. The method of claim 4 in which the tempering step involves the addition of moisture in an amount sufficient to bring the moisture content of the broken kernels within the range from twelve per cent to twenty percent of the dry wheat weight.

9. The method of claim 8 in which the impact step comprises projecting the kernels and seeds at velocities yielding impact effects equivalent to those achieved by centrifugally flinging them from a 13 inch diameter vane-type rotor in which the particles first engage the rotor blade 3½ inches radially out from the rotor center, at rotor speeds in the range from 3300 to 3900 R. P. M., against a corrugated cylindrical impact surface in which the corrugations provide impact surfaces substantially perpendicular to the paths of projection of the particles, as measured in the plane of the rotor, the impact surfaces being inclined approximately twenty degrees from the perpendicular to said plane, and the inner edges of the corrugations being located on a circle of 14⅜ inches diameter, the outer edges on a circle of 15⅜ inches diameter.

10. The method of claim 9 in which the moisture content of the broken kernels is brought to substantially fifteen per cent, the total tempering time between the moisture addition and impact step is substantially five minutes, and the equivalent 13 inch rotor speed is substantially 3500 R. P. M.

11. The method of recovering broken kernels of wheat from a mixture of such kernels with weed seeds of substantially similar size, including at least some of the following seeds, black bindweed, foxtail, cockle, pigweed, and sorrel, which comprises tempering the mixture by addition of moisture in an amount sufficient to bring the moisture content of the broken kernels within the range from twelve per cent to twenty per cent of the dry wheat weight, permitting the added moisture to penetrate the broken kernels during a rest period of at least five minutes, and immediately thereafter subjecting the tempered mixture to an impact step in which each kernel and seed is projected forcibly against an impact surface at velocities yielding impact effects equivalent to those achieved by centrifugally flinging the kernels and seeds from a 13 inch diameter vane-type rotor in which the particles first engage the rotor blades 3½ inches radially out from the rotor center, at rotor speeds in the range from 3300 to 3900 R. P. M., against a corrugated cylindrical impact surface in which the corrugations provide impact surfaces substantially perpendicular to the paths of projection of the particles, as measured in the plane of the rotor, the impact surfaces being inclined approximately twenty degrees from the perpendicular to said plane, and the inner edges of the corrugations being located on a circle of 14⅜ inches diameter, the outer edges on a circle of 15⅜ inches diameter, said impact step shattering substantially all of said weed seeds without substantial shattering of the broken wheat kernels, and thereafter segregating the unshattered broken kernels of wheat from the smaller particles of shattered weed seeds.

12. The method of claim 11 in which the segregation step comprises aspiration of the mixture at air velocities sufficient to lift the shattered weed seed particles without lifting the broken wheat kernels.

13. The method of claim 12 in which the aspirating air velocity is in the range from five to thirteen feet per second uniformly over the cross-sectional area of aspiration.

14. In the process of milling flour from a mixture of whole kernels of wheat, broken kernels of wheat, and weed seeds by cleaning and separating the whole kernels, normally tempering the whole kernels by adding moisture thereto, and subsequently breaking, classifying, purifying and reducing the wheat to produce flour, the improvement which comprises recovering the broken wheat kernels by segregating from the whole kernels a mixture of the broken kernels with weed seeds of substantially similar size, differentially tempering the mixture of weed seeds and broken kernels by addition of moisture during a time sufficient for substantial moisture absorption by the broken kernels and, terminating the tempering before substantial moisture absorption by the unbroken weed seeds takes place, subjecting the tempered mixture of weed seeds and broken kernels to an impact step by forcible projection of the individual seeds and kernels against an impact surface at a velocity sufficient to shatter the weed seeds without substantial shattering of the broken kernels, segregating the broken kernels from the shattered weed seeds by aspiration, and reintroducing the recovered broken wheat kernels in the flour milling process by adding the recovered broken wheat to the whole kernels of wheat at a point subsequent to the addition of moisture to the whole kernels.

15. The process according to claim 14 in which the normal tempering of the whole kernels includes storage of the wheat after addition of moisture for desired moisture distribution and the recovered broken kernels are added to the whole kernels subsequent to the addition of tempering moisture to the latter but prior to the tempering storage of the moistened whole kernels.

16. In the process of milling flour from a mixture of whole kernels of wheat, broken kernels of wheat and weed seeds by cleaning and separating the whole kernels, tempering the whole kernels by adding moisture thereto, and subsequently breaking, classifying, purifying and reducing the wheat to produce flour, the improvement which comprises recovering the broken wheat kernels by segregating from the whole kernels a mixture of the broken kernels with weed seeds of substantially similar size, subjecting the mixture of weed seeds and broken kernels to an impact step by forcible projection of the individual seeds and kernels against an impact surface at a velocity sufficient to shatter the weed seeds without substantial shattering of the broken kernels, segregating the broken kernels from the shattered weed seeds, and reintroducing the recovered broken wheat kernels in the flour milling process by adding them to the whole kernels of wheat at a point subsequent to the addition of moisture to the whole kernels.

References Cited in the file of this patent

UNITED STATES PATENTS

| | | |
|---|---|---|
| 28,071 | Fritz | May 1, 1860 |
| 872,927 | Gehr | Dec. 3, 1907 |
| 979,186 | McGehee | Dec. 20, 1910 |
| 1,024,832 | Cox | Apr. 30, 1912 |
| 1,118,078 | Train | Nov. 24, 1914 |
| 1,921,914 | Edman | Aug. 8, 1933 |
| 2,392,365 | Carter | Jan. 8, 1946 |

FOREIGN PATENTS

| | | |
|---|---|---|
| 309,854 | Great Britain | 1930 |
| 369,950 | Germany | Feb. 24, 1923 |

OTHER REFERENCES

"Flour Milling" by Lockwood, published 1945 by Northern Publishing Co., Ltd. 230 Produce Exchange, New York. Pages 128–131 and 188–192.